United States Patent
Hardage et al.

(10) Patent No.: US 9,081,581 B2
(45) Date of Patent: Jul. 14, 2015

(54) SIZE MIS-MATCH HAZARD DETECTION

(75) Inventors: James Nolan Hardage, Austin, TX (US); Conrado Blasco Allue, Sunnyvale, CA (US); Glen Andrew Harris, Austin, TX (US)

(73) Assignee: ARM Limited, Cambridge (GB)

( * ) Notice: Subject to any disclaimer, the term of this patent is extended or adjusted under 35 U.S.C. 154(b) by 1100 days.

(21) Appl. No.: 12/926,414

(22) Filed: Nov. 16, 2010

(65) Prior Publication Data

US 2012/0124337 A1    May 17, 2012

(51) Int. Cl.
*G06F 15/00* (2006.01)
*G06F 9/30* (2006.01)
*G06F 9/40* (2006.01)
*G06F 9/38* (2006.01)

(52) U.S. Cl.
CPC ............ *G06F 9/3861* (2013.01); *G06F 9/3016* (2013.01); *G06F 9/30112* (2013.01); *G06F 9/384* (2013.01); *G06F 9/3842* (2013.01)

(58) Field of Classification Search
None
See application file for complete search history.

(56) References Cited

U.S. PATENT DOCUMENTS

| | | | | |
|---|---|---|---|---|
| 5,941,984 A * | 8/1999 | Mohri et al. | .......... | 712/218 |
| 6,425,069 B1 * | 7/2002 | Thatcher et al. | .......... | 712/24 |
| 6,898,696 B1 * | 5/2005 | Cheong et al. | .......... | 712/228 |
| 2006/0179346 A1 * | 8/2006 | Bishop et al. | .......... | 714/13 |
| 2010/0274994 A1 * | 10/2010 | Golla et al. | .......... | 712/216 |

* cited by examiner

*Primary Examiner* — George Giroux
(74) *Attorney, Agent, or Firm* — Nixon & Vanderhye P.C.

(57) ABSTRACT

An out-of-order processor 4 groups program instructions together to control their commitment to complete processing. If an instruction within a group has a source operand dependent upon a plurality of destination operands of other instructions then this is identified as a size mismatch hazard. When the program instruction having the size mismatch hazard reaches a commit point within the processor, then it is flushed together with any speculatively executed succeeding program instructions. Furthermore, the group of program instructions containing the program instruction containing the program instruction having the size mismatch is divided into a plurality of groups of program instructions each containing a single program instruction which are then replayed through the processing mechanisms.

19 Claims, 7 Drawing Sheets

FIG. 1

| D0 |
|----|
| D1 |
| D2 |
| D3 |
| D4 |
| D5 |
| D6 |
| D7 |

Double Word Operands

| S0 | S1 |
|----|----|
| S2 | S3 |
| S4 | S5 |
| S6 | S7 |
| S8 | S9 |
| S10 | S11 |
| S12 | S13 |
| S14 | S15 |

Single Word Operands

SØ = destination for VLDR; producer for VADD
DØ = source for VADD; consumer for VADD

SIZE MIS-MATCH HAZARD DETECTION

BACKGROUND OF THE INVENTION

1. Field of the Invention

This invention relates to the field of data processing systems. More particularly, this invention relates to mechanisms for detecting and coping with size mismatch hazards within data processing systems.

2. Description of the Prior Art

It is known to produce data processing systems which operate with different operand sizes. Some program instructions may specify that the operands are single word operands and other program instructions may specify that the operands are double word operands. Within pipelined data processing systems it is also known to utilise operand forwarding mechanisms to help address the problem that a given instruction may consume an operand which is produced by an earlier instruction that has not yet produced the operand. Such forwarding mechanisms may use tags identifying consumer operand registers and producer operand registers in respect of different instructions. This approach is relatively straight forward when a single word producer forwards to a single word consumer or a double word producer forwards to a double word consumer. However, the problem is more complex when there is a mismatch in the operand sizes between the producer and the consumer, e.g. a plurality of single word producers and a double word consumer.

One way of dealing with this problem would be to provide tagging of the operands for use in the forwarding mechanisms at the smallest granularity of the operand size. A consequence of this would be that an operand having a size greater than the granularity of the smallest operand could require multiple tags. These tags require routing and switching between stages of the processing pipeline. Accordingly, the use of such fine-grained tagging to deal with the issue of operand forwarding when supporting operands of different sizes is inefficient in terms of circuit area, cost, efficiency etc.

SUMMARY OF THE INVENTION

Viewed from one aspect the present invention provides an apparatus for executing a stream of program instructions, said apparatus comprising:

processing circuitry configured to perform within one or more processing pipelines operations as specified by said stream of program instructions;

instruction group forming circuitry configured to divide said stream of program instructions into a plurality of groups of program instructions, each of said plurality of groups comprising one or more program instructions committed together for completion; and hazard detection circuitry configured to identify one or more processing hazards preventing proper processing of a group of program instructions by said processing circuitry; wherein said hazard detection circuitry detects as a size mismatch hazard a consumer program instruction specifying a source operand register with a source operand value formed from a concatenation of a plurality of destination operand values produced by one or more producer program instructions, said one or more producer program instructions being uncompleted and preceding said consumer program instruction in program order within said stream of program instructions; and said processing circuitry, upon detection of a group of program instructions including one or more program instructions detected as subject to a size mismatch hazard and at a commit point within said one or more processing pipelines beyond which said group of program instructions is committed to complete processing:

(i) flushes from said one or more processing pipelines for re-dispatch thereto said group of program instructions and any program instructions succeeding said group of program instructions in program order within said stream of program instructions; and (ii) controls said instruction group forming circuitry to divide said group of program instructions to form a plurality of groups of program instructions to be separately re-dispatched to said one or more processing pipelines.

The present technique addresses the size mismatch hazard problem by identifying the hazard within groups of instructions which would otherwise be committed for completion together, flushing any succeeding (younger) groups of program instructions from the pipelines and then separately re-dispatching a plurality of groups of program instructions created by the division of the group having the size mismatch hazard. This flushing, division and replay approach reduces the speed of processing progress, but it enables the size mismatch hazards to be dealt with using a reduced circuit overhead and the performance impact in reality relatively low as there are few legitimate processing situations in which the size mismatch hazard is likely to arise.

Whilst the present technique may be used in a variety of different processors, such as in-order processors, the technique is well suited to systems in which register renaming is used to map between architectural register specifiers and physical register specifiers within an out-of-order processor.

Within such systems the data may be stored within a physical register store accessed using physical registers corresponding to architectural registers of different bit widths such that the architectural registers alias with each other and a given bit of data may be accessed both as part of an N-bit physical register and as part of an M-bit physical register, where M is different N.

Although there are other possibilities, in at least some embodiments a program instruction progressing along one or more processing pipeline has for each operand thereof a tag specifying which architectural register corresponds to the physical register storing that operand and a register size value specifying the bit width of that operand. Such embodiments using a register size value and a single tag value are an efficient alternative to the use of multiple tag values at the smallest granularity of the operand size.

Dispatch queue circuitry may serve to store the tag value and the register size value as well as optionally also storing a group marker for each program instruction indicating into which group of program instructions it has been allocated and a size mismatch hazard marker indicating if a size mismatch hazard has been detected for any source operand of that program instruction.

It will be appreciated that the operand sizes may vary relative to each other in a variety of different ways. In some embodiments the operand sizes may be such that $M=2*N$, e.g. single word operands and double word operands.

In this context, a source operand may be a double word data value and a destination operands may be two single word data values concatenated to form the double word data value.

The step of dividing the program instructions within the group in which a size mismatch hazard has been detected could take a variety of different forms. In some embodiments the step of dividing may divide the group to form a plurality of new groups of program instructions each containing a single program instruction. It will be appreciated that the single program instruction may itself be divided into multiple micro-operations which are managed together within a group of program instructions.

The program instructions which are passed along the processing pipelines may have a variety of different forms and may include arithmetic or logical instructions, load and store instructions, vector instructions, integer instructions, floating point instructions, SIMD instructions and instructions of other forms as appropriate.

The instruction group forming circuitry may be conveniently provided as part of the instruction decoding circuitry which decodes the stream of program instructions as this simplifies implementation when instruction group forming and instruction decoding are performed within the same circuit region.

The hazard detection circuitry may be part of the register renaming circuitry.

Viewed from another aspect the present invention provides an apparatus for executing a stream of program instructions, said apparatus comprising:

processing means for performing within one or more processing pipelines data operations as specified by said stream of program instructions;

instruction group forming means for dividing said stream of program instructions into a plurality of groups of program instructions, each of said plurality of groups comprising one or more program instructions committed together for completion; and hazard detection means for identifying one or more processing hazards preventing proper processing of a group of program instructions by said processing means; wherein said hazard detection means detects as a size mismatch hazard a consumer program instruction specifying a source operand register with a source operand value formed from a concatenation of a plurality of destination operand values produced by one or more producer program instructions, said one or more producer program instructions being uncompleted and preceding said consumer program instruction in program order within said stream of program instructions; and said processing means, upon detection of a group of program instructions including one or more program instructions detected as subject to a size mismatch hazard and at a commit point within said one or more processing pipelines beyond which said group of program instructions is committed to complete processing:

(i) flushes from said one or more processing pipelines for re-dispatch thereto said group of program instructions and any program instructions succeeding said group of program instructions in program order within said stream of program instructions; and (ii) controls said instruction group forming circuitry to divide said group of program instructions to form a plurality of groups of program instructions to be separately re-dispatched to said one or more processing pipelines.

Viewed from a further aspect the present invention provides a method of executing a stream of program instructions, said method comprising the steps of:

performing within one or more processing pipelines data operations as specified by said stream of program instructions;

dividing said stream of program instructions into a plurality of groups of program instructions, each of said plurality of groups comprising one or more program instructions committed together for completion; and identifying one or more processing hazards preventing proper processing of a group of program instructions; wherein said identifying detects as a size mismatch hazard a consumer program instruction specifying a source operand register with a source operand value formed from a concatenation of a plurality of destination operand values produced by one or more producer program instructions, said one or more producer program instructions being uncompleted and preceding said consumer program instruction in program order within said stream of program instructions; and upon detection of a group of program instructions including one or more program instructions detected as subject to a size mismatch hazard and at a commit point within said one or more processing pipelines beyond which said group of program instructions is committed to complete processing:

(i) flushing from said one or more processing pipelines for re-dispatch thereto said group of program instructions and any program instructions succeeding said group of program instructions in program order within said stream of program instructions; and (ii) dividing said group of program instructions to form a plurality of groups of program instructions to be separately re-dispatched to said one or more processing pipelines.

The above, and other objects, features and advantages of this invention will be apparent from the following detailed description of illustrative embodiments which is to be read in connection with the accompanying drawings.

DESCRIPTION OF THE EMBODIMENTS

Figure 1:
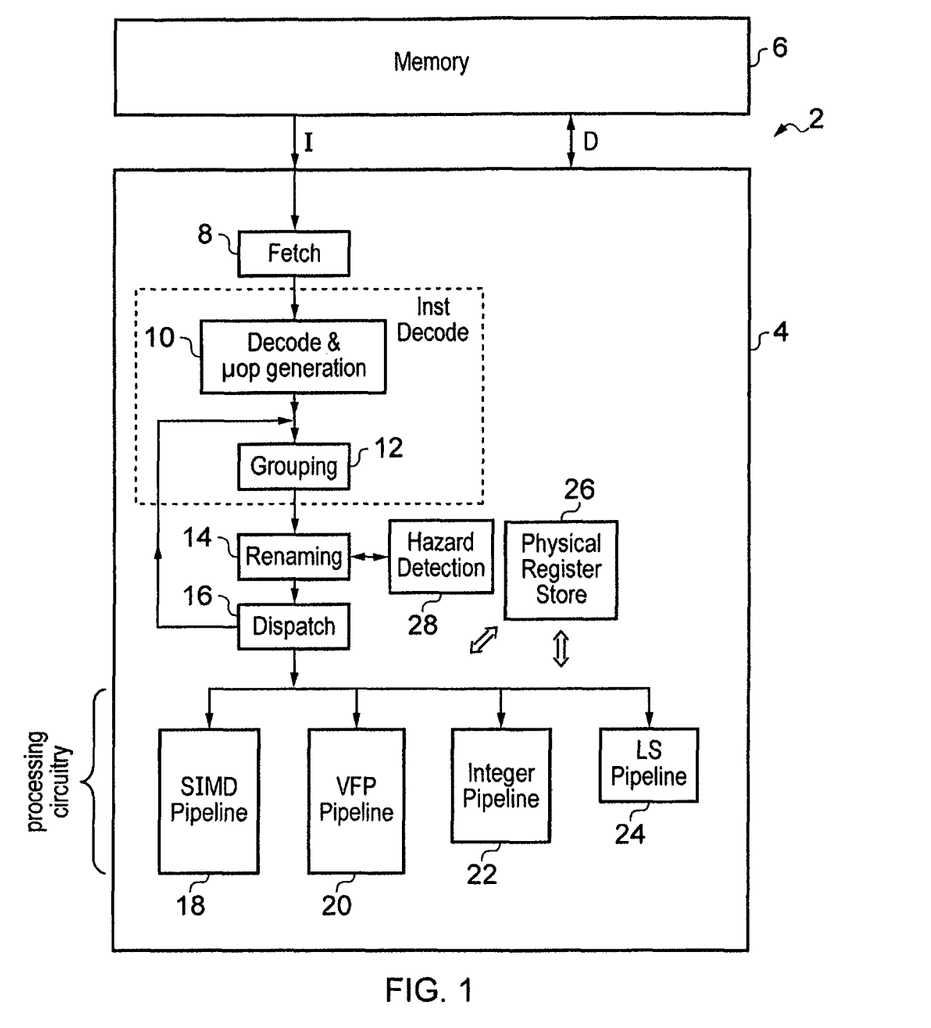
FIG. 1 schematically illustrates a data processing system including an out-of-order processor including multiple processing pipelines.

FIG. 1 illustrates a data processing system 2 including a processor 4 coupled to a memory 6. The memory 6 stores data to be manipulated and program instructions which form a stream of program instructions having a program order to the processor 4. Within the processor 4, the stream of program instructions pass through a sequence of processing stages. These processing stages include a fetch stage 8, a decode and micro-op generation stage 10, a grouping stage 12, a renaming stage 14 and a dispatch stage 16. From the dispatch stage 16 program instructions (which have been broken down into one or more micro-operations) are dispatched to a selected one of a plurality of processing pipelines including a SIMD pipeline 18, a VFP pipeline 20, an integer pipeline 22 and a load/store pipeline 24. A physical register store 26 stores data values to be accessed as source operands or destination operands for the program instructions being executed. A given data bit value within the physical register store 26 may be accessed as part of a single word register or as part of a double word register as will be described below.

The single word registers and the double word registers thus alias against each other. A consequence of this aliasing is that a program instruction using a double-word source operand read from a double word register may correspond to two concatenated single word operands generated as the contents of two single word registers by one or more earlier program instructions. There is thus an independence between a plurality of destination operand values produced by one or more producer program instructions (the program instructions which generate the single word operands stored within the single word registers) and a consumer program instruction which specifies as a source operand value formed from a concatenation of the plurality of destination operand values. This represents a size mismatch hazard for the consumer program instruction. Hazard detection circuitry 28 coupled to the renaming stage 14 serves to detect such a size mismatch hazard based upon the architectural tag values and the renamed tag values associated with the registers within the physical register store 26 being accessed by the program instructions.

The processing pipelines 18, 20, 22, 24 may be considered as processing circuitry configured to perform processing operations as specified by the stream of program instructions read from the memory 6. The instruction grouping stage 12 serves to divide the stream of program instructions into a plurality of groups of program instructions which each of these groups comprising one or more instructions which are committed together for completion (e.g. after all branches and potential data aborts have resolved). The groups of program instructions are thus managed together at least in respect of controlling whether or not they are permitted to complete their execution within the out-of-order processor 4.

It will be appreciated by those in this technical field that a program instruction or group of program instructions may be dispatched by the dispatch stage 16 to one of the processing pipelines 18, 20, 22, 24 where it can be stored within a local issue queue before being issued into the relevant processing pipeline 18, 20, 22, 24 as a processing slot becomes available within that processing pipeline 18, 20, 22, 24. The techniques of register renaming, instruction dispatch, instruction issue, instruction retirement and instruction commitment will be familiar to those in the technical field of out-of-order processors and will not be described herein in further detail. It will further be appreciated that the processor 4 will typically include many further circuit elements and such circuit elements have been omitted from FIG. 1.

Figure 2:
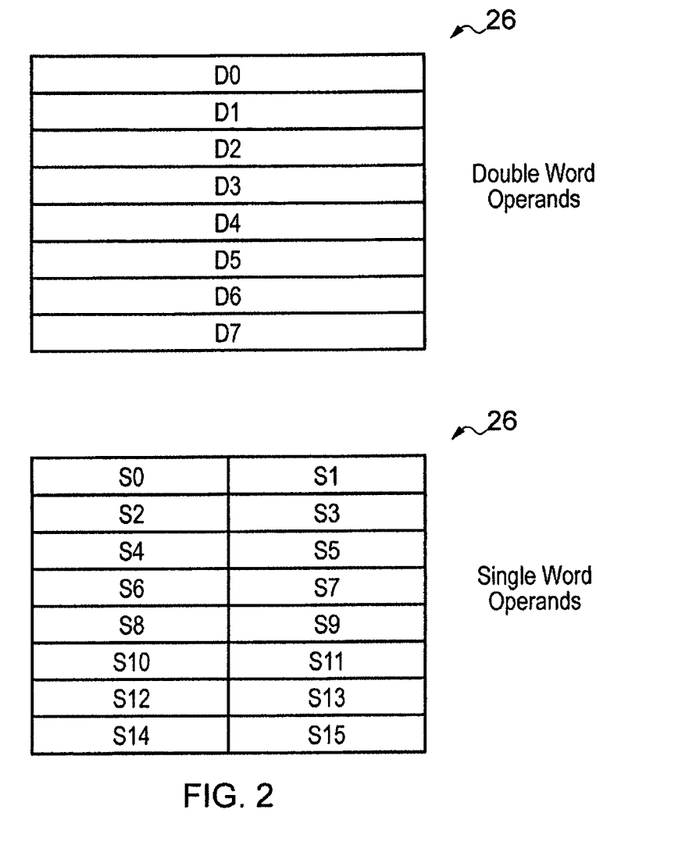
FIG. 2 schematically illustrates a physical register store which may be accessed as double word registers and/or single word registers.

FIG. 2 illustrates how the physical register store 26 may be accessed using double word operands via double word registers or using single word operands via single word registers. A given data value bit stored within the physical register store 26 may be either accessed as a bit within a double word operand or a corresponding bit within a single word operand. Thus, for example, a bit within the single word operand register S4 may be accessed as a bit within the double word operand register D2. The single word registers and the double word registers alias together. As a consequence, if a consumer instruction specifies a double word register as storing a source operand, then this source operand may be dependent upon two single word operands that are destination registers of one or more other program instructions. In this circumstance, there is not a simple one-to-one relationship that may be tracked between a consumer program instruction/register and a producer program instruction/register using a single tag value. This represents a size mismatch hazard.

Within normal usage, such size mismatch hazards are relatively rare. Some uses which are legitimate may be identified and dealt with by converting double word consumer program instructions into multiple single word consumer instructions thereby simplifying their dependency tracking. However, providing such mechanisms to trap all size mismatch hazards would be inefficient and instead the following techniques may be used to deal with size mismatch hazards in a way which avoids processing deadlock whilst consuming relatively little additional circuit resource/overhead.

Figure 3:
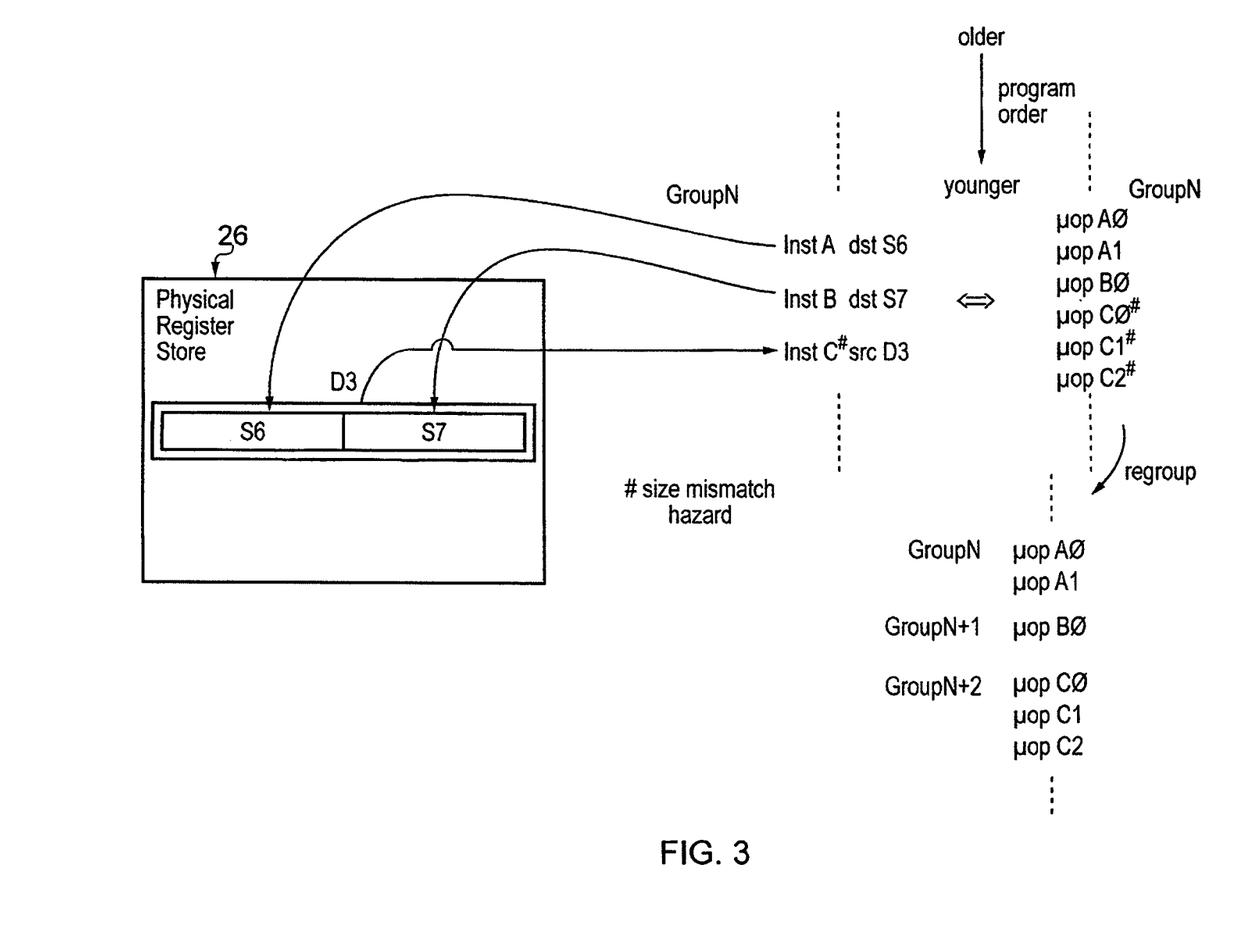
FIG. 3 schematically illustrates aliasing between a double word register and two single word registers within a physical register store.

FIG. 3 schematically illustrates a double word register D3 aliased with two single word registers S6 and S7 within the physical register store 26. Instruction A and Instruction B respectively serve as producer program instructions having destination registers S6 and S7. Instruction C is a consumer program instruction which reads as a source operand register D3. Instruction C thus has a data dependence upon both Instruction A and Instruction B. The hazard detection circuitry 28 serves to identify this size mismatch hazard at the register renaming stage 14.

As illustrated in FIG. 3, the Instructions A, B and C are part of one group of instructions which are committed together to complete their processing in the out-of-order processor 4. The decode and micro-op generation stage 10 serves to map the program instructions A, B and C, for example, to micro-ops A0, A1, B0, C0, C1 and C2 as shown. A given program instruction may map to one or more micro-ops. The micro-ops are at this stage still part of the same group of instructions.

As will be familiar to those in this technical field, a stream of program instructions has a program order in which the programmer envisages the program instructions will be executed. In practice, an out-of-order processor 4 may execute the instructions in a different order so as to achieve higher levels of performance. These techniques may use register renaming as well as mechanisms for controlling and managing dispatch of instructions to different instruction pipelines, issue of instructions into those pipelines, commitment to the execution of those instructions when, for example, possible exception conditions are no longer present, retirement of instructions from speculative execution and other techniques. Within this context the program instructions may be managed as groups of program instructions each with a group identifier. The management shared by such groups can include the management of committing those program instructions when they have completed their execution, i.e. permitting those instructions to make changes to the architectural state of the processor 4, such as changes to architectural register values, configuration register values, writes external of the processor etc.

FIG. 3 illustrates how the group of program instructions A, B, C including a size mismatch hazard correspond to a group of micro operations also incorporating the size mismatch hazard. This size mismatch hazard is detected by the hazard detection circuitry 28 which marks the relevant program instructions or micro operations with a size mismatch hazard marker. The dispatch stage 16 (or alternatively the commit mechanisms as discussed below) may detect the size mismatch hazard marker and flush the group of program instructions as well as any speculatively processed succeeding (younger) instructions already within the processing pipelines, 18, 20, 22 and 24. The group of program instructions including the size mismatch hazard is then divided into a plurality of groups of program instructions each corresponding to a single program instruction (NB one of these divided groups may contain multiple micro-operations corresponding to a single program instruction as a size mismatch hazard will not arise between micro operations of the same program instruction).

Figure 4:
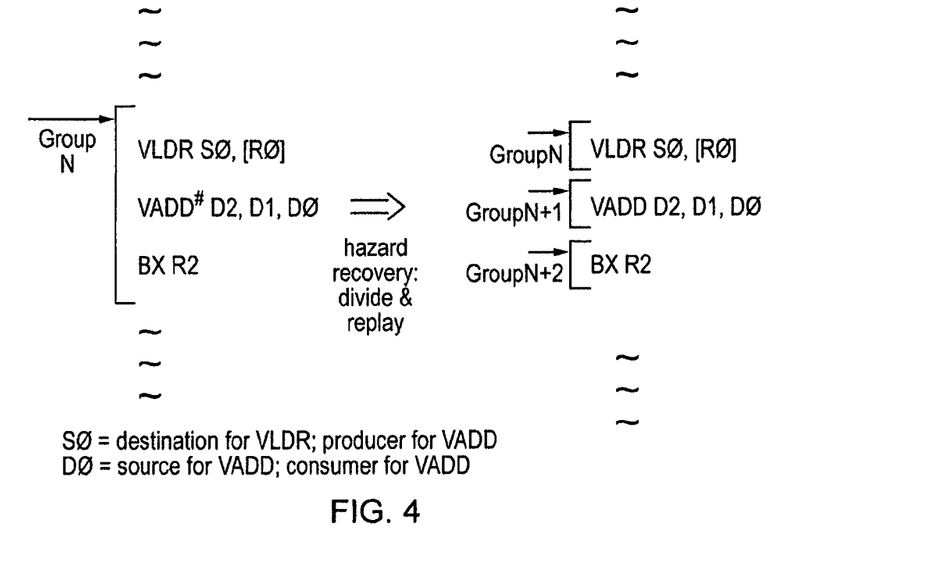
FIG. 4 schematically illustrates the division of a group of program instructions including a size mismatch hazard.

FIG. 4 schematically illustrates a stream of program instructions including a group of program instructions comprising a VLDR instruction, a VADD instruction and a BX instruction. These are instructions of the ARM instruction set used by processors designed by ARM Limited of Cambridge, England. In the example illustrated, there is a size mismatch hazard between a double word consumer register D0 of the VADD instruction and the single word producer register S0 of the VLDR instruction. This size mismatch hazard is detected by the hazard detection circuitry 28 at the renaming stage 14 and when the group of program instructions including the hazard marked program instruction concerned reaches the dispatch stage 16 (or the commit point), the hazard recovery mechanism is invoked. This hazard recovery mechanism is to divide the initial group down into multiple groups each containing a single program instruction and then replay these program instructions back through the grouping, renaming and dispatch stages. In addition to the flushing of the group of program instructions containing the size mismatch hazard, any succeeding program instructions which have been speculatively processed are also flushed.

Figure 5:
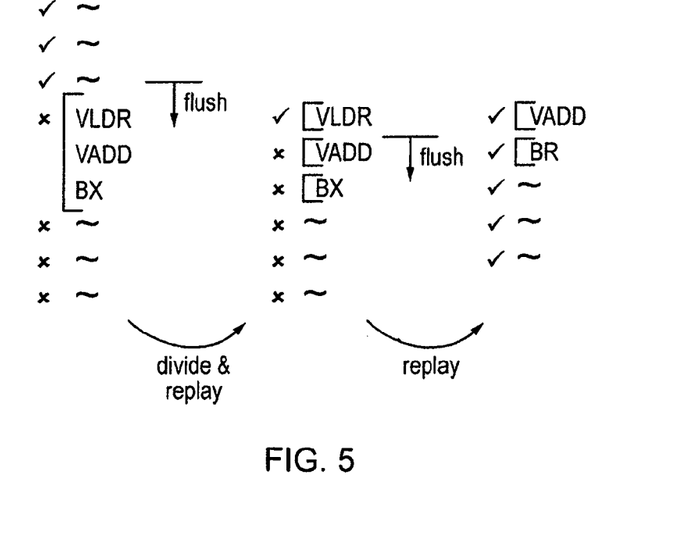
FIG. 5 schematically illustrates the processing of a group of program instructions having a size mismatch hazard over a series of two replay cycles.

FIG. 5 schematically illustrates the handling of the group of program instructions of FIG. 4 upon different attempted passes through the system. Upon the first pass the group of program instructions containing VLDR, VADD and BX is identified as having a size mismatch hazard and is flushed. Consequently, all three instructions of that group and any speculatively executed succeeding instructions are not completed. Upon the first replay the group of program instructions is divided into multiple groups each containing a single program instruction. On this first replay pass, the first instruction VLDR will be dispatched by the dispatch stage 16 as it is not itself marked as having a size mismatch hazard. However, the second instruction VADD is marked as having a mismatch hazard (as still detected on the second pass through the renaming stage 14 by the hazard detection circuitry 28) and this will again trigger a flush of the VADD instruction and any following instructions. On the third pass through the system the instruction VADD will not have been marked as a size mismatch hazard at the renaming stage 14 by the hazard detection circuitry 28 since the producer instruction upon which it depended for its source operands, i.e. the VLDR instruction, was completed on the previous pass and will have resolved. There will thus not be a dependence upon a plurality of destination operand values from one or more uncompleted producer instructions.

Figure 6:
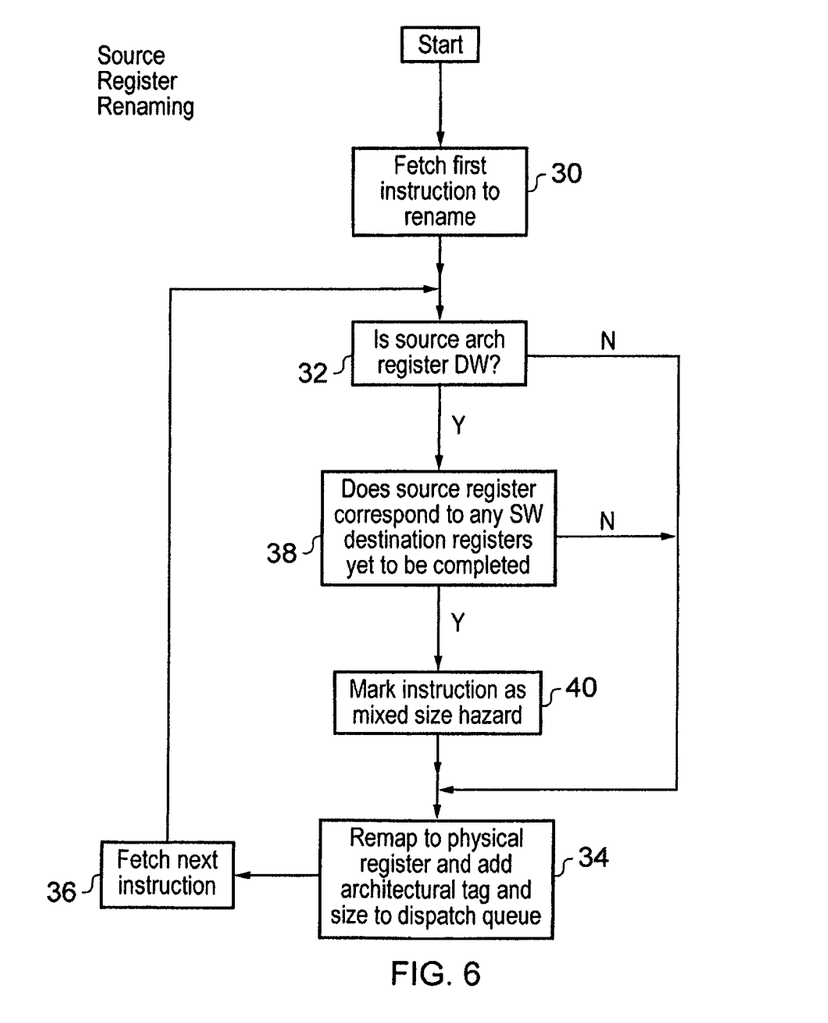
FIG. 6 is a flow diagram schematically illustrating mixed size hazard detection as part of source register renaming.

FIG. 6 is a flow diagram schematically illustrating a portion of the source register renaming processing performed by the renaming stage 14. At step 30 a first instruction to rename is fetched. Step 32 determines whether or not a source architectural register within that instruction is a double word register. If there is no double word source register within the instruction to be renamed, then a size mismatch hazard of the type discussed above is not possible for that instruction and processing will proceed to step 34 where the mapping is performed to a physical register and the appropriate architectural tag value and size markers are added to the data associated with that instruction within a dispatch queue of the dispatch stage 16. Processing then passes to step 36 where the next instruction is fetched prior to returning to step 32.

If the determination at step 32 is that the instruction to be renamed does contain at least one double word source register, then step 38 serves to determine whether or not that double word source register corresponds to any single word destination registers of program instructions which have yet to be completed. This may be determined from rename tables used within the rename stage 14. If the determination at step 38 is that there is no dependence upon any single word destination registers of program instruction registers that have yet to be completed, then processing can again pass to step 34 as there is no size mismatch hazard. However, if step 38 does detect such a dependence, then processing passes to step 40 where the instruction is marked as having a mixed size hazard.

Figure 7:
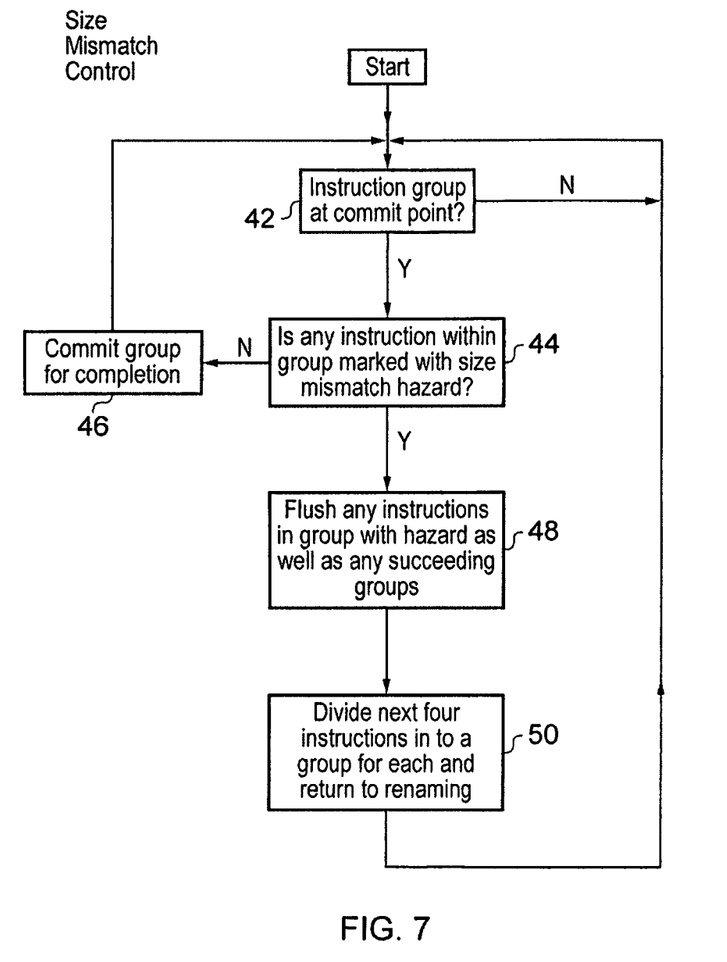
FIG. 7 is a flow diagram schematically illustrating size mismatch control.

FIG. 7 is a flow diagram schematically illustrating size mismatch hazard control which may be performed as part of the operations of a commit mechanism. Step 42 determines whether an instruction group is at its commit point at which it may be committed to complete its execution. If there is such an instruction group, then step 44 determines whether or not any of the instructions within that group is marked as having a size mismatch hazard. If there is no program instruction within that group marked with a size mismatch hazard, then processing proceeds to step 46 where the instruction group is committed for completion.

If the determination at step 44 is that the instruction group contains at least one instruction marked with a size mismatch hazard, then processing proceeds to step 48 where any instructions within that group with the hazard are flushed as well as any succeeding groups which had been speculatively processed. Step 50 then divides the next four instructions within the instructions which are returned for replay to the grouping stage 12 into groups each containing an individual instruction before processing is returned to step 42. Thus, a group of program instructions identified as containing a cycle mismatch hazard is broken down into a plurality of groups of program instructions containing a single program instruction before those newly formed groups are replayed through the processing mechanisms. This permits a single word producer instruction to potentially complete separately from a double word consumer instruction such that a deadlock will not arise.

Figure 8:
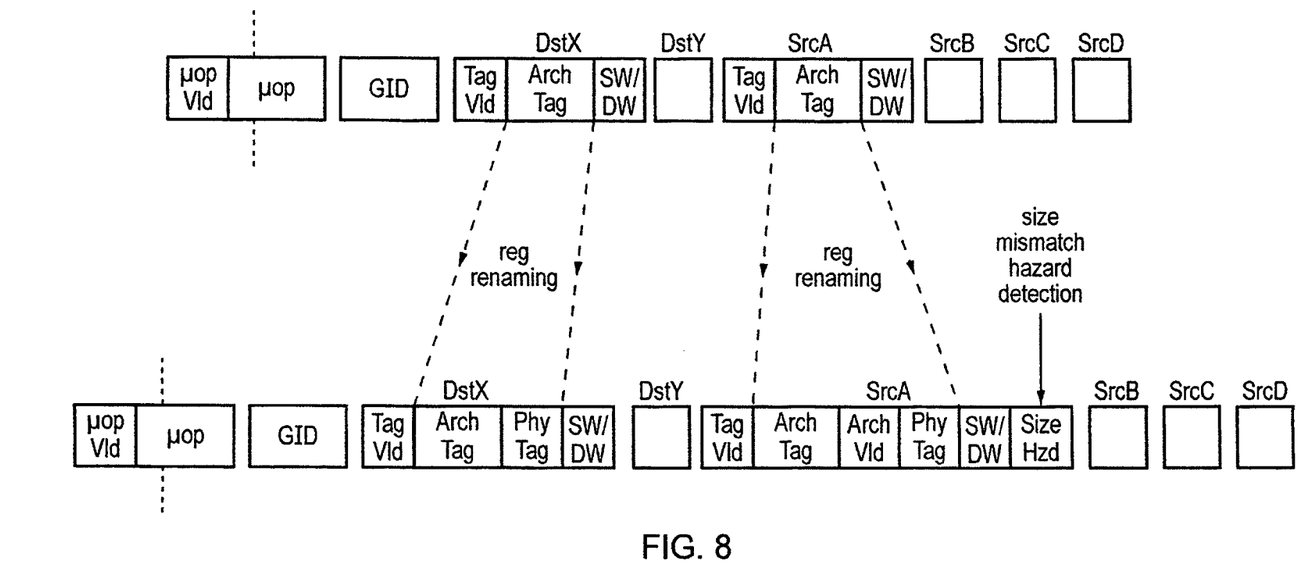
FIG. 8 schematically illustrates tag data and other data associated with program instructions (or micro-operations) within a queue and a dispatch queue.

FIG. 8 schematically illustrates a line of micro-op data stored within the renaming queue to be renamed and then in the dispatch queue. Each program instruction includes up to two destination registers and up to four source registers. The destination registers and the source registers are marked with a size tag indicating whether they are single word registers or double word registers. They also are marked with a validity flag. Each program instruction further bears a group identifier GID together with the micro operation itself and a validity flag for the micro operation.

When the micro operations (program instructions) have been renamed a physical tag marker is added in conjunction with the architectural tag marker to indicate which physical register within the physical register store 26 is being used for the architectural register as specified within the program instruction itself. In the case of source registers these are additionally marked with a size mismatch hazard marker if the hazard detection circuitry 28 indicates a size mismatch hazard as previously discussed. Such instructions may be permitted to be dispatched and advance up to their completion point prior to being, divided from others within their group and replayed as previously discussed. Permitting the instructions to advance as far as their commit point increases the chances that any preceding producer instruction upon which they have a dependence giving rise to the size mismatch hazard will have resolved when the instruction is replayed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for executing a stream of program instructions, said apparatus comprising:
   processing circuitry configured to perform within one or more processing pipelines operations as specified by said stream of program instructions;
   instruction group forming circuitry configured to divide said stream of program instructions into a plurality of groups of program instructions, each of said plurality of groups comprising one or more program instructions committed together for completion; and
   hazard detection circuitry configured to identify one or more processing hazards preventing proper processing of a group of program instructions by said processing circuitry; wherein
   said hazard detection circuitry detects as a size mismatch hazard a consumer program instruction specifying a source operand register with a source operand value formed from a concatenation of a plurality of destination operand values produced by one or more producer program instructions, said one or more producer program instructions being uncompleted and preceding said consumer program instruction in program order within said stream of program instructions; and
   said processing circuitry, upon detection of a group of program instructions including one or more program instructions detected as subject to a size mismatch hazard and at a commit point within said one or more processing pipelines beyond which said group of program instructions is committed to complete processing, is configured to:
   (i) flush from said one or more processing pipelines for re-dispatch thereto said group of program instructions and any program instructions succeeding said group of program instructions in program order within said stream of program instructions; and
   (ii) control said instruction group forming circuitry to divide said group of program instructions to form at least two groups of program instructions, said at least two groups of program instructions are separately re-dispatched to said one or more processing pipelines.

2. Apparatus as claimed in claim 1, comprising:
   a physical register store configured to store data values corresponding to architectural registers as specified within program instructions of said stream of program instructions; and
   register renaming circuitry configured to provide a mapping between architectural register specifiers of architectural registers as used at different points within said stream of program instructions and corresponding physical registers specifiers of physical registers within said physical register store, wherein
   said groups of program instructions are processed out-of-order with respect to said program order.

3. Apparatus as claimed in claim 2, wherein data stored within said physical register store may be accessed using physical registers with corresponding architectural registers of different bit widths such that a given bit of data may be accessed as part of both an N-bit physical register and an M-bit register, where N is different from M.

4. Apparatus as claimed in claim 3, wherein at least one program instruction progressing along said one or more processing pipelines has for each operand thereof:
   (i) one tag value specifying which architectural register corresponds to a physical register for storing said operand of said at least one program instruction; and
   (ii) a register size value specifying a bit width of said operand.

5. Apparatus as claimed in claim 4, comprising dispatch queue circuitry configured to store at least said tag value and said register size value of each program instruction awaiting dispatch, said dispatch queue further storing:
   (i) a group marker for each program instruction indicating into which group of program instructions said program instruction has been allocated; and
   (ii) a size mismatch hazard marker for each program instruction indicating if a size mismatch hazard has been detected by said hazard detecting circuitry for any source operand of said program instruction.

6. Apparatus as claimed in claim 3, wherein M=2*N.

7. Apparatus as claimed in claim 6, wherein said source operand value is a double word data value and said plurality of destination operands are two single word data values concatenated to form said double word data value.

8. Apparatus as claimed in claim 1, wherein said instruction group forming circuitry divides said group of program instructions to form at least two groups of program instructions each containing a single program instruction.

9. Apparatus as claimed in claim 1, wherein said instruction group forming circuitry is part of instruction decoding circuitry configured to decode said stream of program instructions to generate control signals for controlling said processing circuitry to perform said processing operations as specified by said stream of program instructions.

10. Apparatus as claimed in claim 2, wherein said hazard detection circuitry is part of said register renaming circuitry.

11. Apparatus for executing a stream of program instructions, said apparatus comprising:
    means for performing pipeline processing data operations as specified by said stream of program instructions;
    means for dividing said stream of program instructions into a plurality of groups of program instructions, each of said plurality of groups comprising one or more program instructions committed together for completion; and
    means for identifying one or more processing hazards preventing proper processing of a group of program instructions by said means and for detecting as a size mismatch hazard a consumer program instruction specifying a source operand register with a source operand value formed from a concatenation of a plurality of destination operand values produced by one or more producer program instructions, said one or more producer program instructions being uncompleted and preceding said consumer program instruction in program order within said stream of program instructions; and
    means for flushing from said one or more processing pipelines for re-dispatch thereto said group of program instructions and any program instructions succeeding said group of program instructions in program order within said stream of program instructions when a group of program instructions including one or more program instructions is detected as subject to a size mismatch hazard and at a commit point within said one or more processing pipelines beyond which said group of program instructions is committed to complete processing; and means for controlling said instruction group forming circuitry after said flushing to divide said group of program instructions to form at least two groups of program instructions, said at least two groups of program instructions are separately re-dispatched to said one or more processing pipelines.

12. A method of executing a stream of program instructions, said method comprising the steps of:

performing within one or more processing pipelines data operations as specified by said stream of program instructions;

dividing said stream of program instructions into a at least two groups of program instructions, each of said at least two groups comprising one or more program instructions committed together for completion; and identifying one or more processing hazards preventing proper processing of a group of program instructions; wherein said identifying detects as a size mismatch hazard a consumer program instruction specifying a source operand register with a source operand value formed from a concatenation of a plurality of destination operand values produced by one or more producer program instructions, said one or more producer program instructions being uncompleted and preceding said consumer program instruction in program order within said stream of program instructions; and upon detection of a group of program instructions including one or more program instructions detected as subject to a size mismatch hazard and at a commit point within said one or more processing pipelines beyond which said group of program instructions is committed to complete processing, said detecting step including the steps of:
 (i) flushing from said one or more processing pipelines for re-dispatch thereto said group of program instructions and any program instructions succeeding said group of program instructions in program order within said stream of program instructions; and
 (ii) dividing said group of program instructions to form at least two groups of program instructions, said at least two groups of program instructions are separately re-dispatched to said one or more processing pipelines.

13. A method as claimed in claim 12, comprising:

storing within a physical register store data values corresponding to architectural registers as specified within program instructions of said stream of program instructions; and providing a mapping between architectural register specifiers of architectural registers as used at different points within said stream of program instructions and corresponding physical registers specifiers of physical registers within said physical register store, wherein said groups of program instructions are processed out-of-order with respect to said program order.

14. A method as claimed in claim 13, wherein data stored within said physical register store may be accessed using physical registers with corresponding architectural registers of different bit widths such that a given bit of data may be accessed as part of both an N-bit physical register and an M-bit register, where N is different from M.

15. A method as claimed in claim 14, wherein at least one program instruction progressing along said one or more processing pipelines has for each operand thereof:
 (i) one tag value specifying which architectural register corresponds to a physical register for storing said operand of said at least one program instruction; and
 (ii) a register size value specifying a bit width of said operand.

16. A method as claimed in claim 15, comprising storing within a dispatch queue at least said tag value and said register size value of each program instruction awaiting dispatch, said dispatch queue further storing:
 (i) a group marker for each program instruction indicating into which group of program instructions said program instruction has been allocated; and
 (ii) a size mismatch hazard marker for each program instruction indicating if a size mismatch hazard has been detected for any source operand of said program instruction.

17. A method as claimed in claim 14, wherein $M=2*N$.

18. A method as claimed in claim 17, wherein said source operand value is a double word data value and said plurality of destination operands are two single word data values concatenated to form said double word data value.

19. A method as claimed in claim 12, wherein said dividing divides said group of program instructions to form a plurality of groups of program instructions each containing a single program instruction.

* * * * *